US007281830B2

(12) United States Patent
Ishida

(10) Patent No.: US 7,281,830 B2
(45) Date of Patent: Oct. 16, 2007

(54) VEHICLE HEADLAMP AND LAMP UNIT

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 71 days.

(21) Appl. No.: 11/197,582

(22) Filed: Aug. 5, 2005

(65) Prior Publication Data

US 2006/0028831 A1 Feb. 9, 2006

(30) Foreign Application Priority Data

Aug. 6, 2004 (JP) .......................... P.2004-230661

(51) Int. Cl.
*B60Q 1/00* (2006.01)
*B60Q 3/00* (2006.01)

(52) U.S. Cl. ........................ 362/538; 362/335; 362/539

(58) Field of Classification Search ................ 362/520, 362/522, 308, 328, 296, 307–311, 326–329, 362/335, 516, 538–539; 359/409, 711, 649–651
See application file for complete search history.

(56) References Cited

U.S. PATENT DOCUMENTS 4,811,174 A * 3/1989 Kanzler et al. ............. 362/538
4,899,261 A * 2/1990 Blusseau et al. ............ 362/251
4,928,213 A * 5/1990 Nakata ........................ 362/539
5,285,358 A * 2/1994 Watanabe et al. ........... 362/538
6,123,440 A * 9/2000 Albou ......................... 362/516
6,186,651 B1 * 2/2001 Sayers et al. ............... 362/512
6,742,918 B2 * 6/2004 Collins ....................... 362/509
2003/0107901 A1 * 6/2003 Tokoro et al. .............. 362/538

FOREIGN PATENT DOCUMENTS

JP 63-314701 A 12/1988

* cited by examiner

*Primary Examiner*—Jong-Suk (James) Lee
*Assistant Examiner*—Edmund C. Kang
(74) *Attorney, Agent, or Firm*—Sughrue Mion, PLLC

(57) ABSTRACT

The projection lens of a lamp unit is configured as a toroidal lens. The toroidal lens extends in an arcuate profile having a central axis on a plumb line passing through a predetermined point on the optical axis behind the projection lens. Vertical cross sections of the arcuate profile have the same shape. The vertical cross section profile of the rear surface of the projection lens is configured by a rearward tilted straight line. The vertical cross section profile of the front surface of the projection lens is configured by a convex curved surface formed so as to position the rear focus point of the projection lens on the optical axis.

8 Claims, 8 Drawing Sheets

VEHICLE HEADLAMP AND LAMP UNIT

The present application claims foreign priority based on Japanese Patent Application No. P.2004-230661, filed on Aug. 6, 2004, the contents of which are incorporated herein by reference.

BACKGROUND OF THE INVENTION

1. Field of the Invention

The present invention relates to a vehicle headlamp equipped with a so-called projector-type lamp unit.

2. Related Art

In general, a vehicle headlamp is provided with a lamp room formed by a lamp body and a translucent cover attached to a front end opening of the lamp body, the lamp room accommodating a lamp unit having an optical axis extending in the longitudinal direction of a vehicle. Disclosed in JP-A-63-314701 is a projector-type lamp unit as one type of the lamp unit.

In the projector-type lamp unit, a projection lens is disposed on an optical axis of the projector-type lamp unit, and a light source is disposed behind a rear focus point of the projection lens. Light from the light source onto a reflector is reflected so as to direct to an area close to the optical axis. As the projection lens, a plano-convex lens is used. In the plano-convex lens, a front surface is a convex curved surface and a rear surface is a plane.

However, the projection lens has problems described below since a plane constituting its rear surface is orthogonal to an optical axis.

In general, a vehicle headlamp is arranged at the front end of a vehicle, so that its translucent cover often has a surface profile tilted upward along a vehicle profile. A projection lens of the lamp unit is constituted by a plane whose rear surface is orthogonal to an optical axis thus it is impossible to arrange the projection lens along the translucent cover. This results in a larger depth dimension of a lamp room accommodating the lamp unit.

Another problem is that, when the lamp unit is observed through the translucent cover, only its projection lens appears in the front direction of the vehicle, which lacks a novel design of the headlamp.

SUMMARY OF THE INVENTION

In accordance with one or more embodiments of the present invention, a vehicle headlamp is capable of reducing the depth dimension of a lamp room as well as providing the lighting fixture design with a novelty.

In accordance with one or more embodiments of the present invention, a vehicle headlamp comprises: a lamp room formed by a lamp body and a translucent cover attached to the front end opening of the lamp body, the lamp room accommodating a lamp unit having an optical axis extending in the longitudinal direction of a vehicle, the lamp unit including a projection lens arranged on the optical axis, a light source arranged behind the rear focus point of the projection lens, and a reflector for reflecting light from the light source in forward direction close to the optical axis. In the vehicle headlamp, the projection lens is configured as a toroidal lens extending in an arcuate profile having a central axis on a plumb line passing through a predetermined point on the optical axis behind the projection lens. Vertical cross sections of the arcuate profile have the same shape. The respective vertical cross sections are provided on vertical planes that extend through the toroidal lens and includes the plumb line. Vertical cross section profiles of the rear surface of the toroidal lens are configured by rearward titled straight lines. Vertical cross section profiles of the front surface of the toroidal lens are configured by convex curved lines formed so as to position the rear focus point of the projection lens on the optical axis.

In accordance with one or more embodiments of the present invention, the translucent cover has a surface profile tilted upward along the vehicle profile and outward in the vehicle width direction.

In accordance with one or more embodiments of the present invention, the lamp unit further includes a shade for shielding part of the reflected light from a reflector. An upper end edge of the shade is positioned near the optical axis in the vicinity of the rear focus point.

In accordance with one or more embodiments of the present invention, the predetermined point positions on a front side of the rear focus point.

In accordance with one or more embodiments of the present invention, a rearward tilt angle of the rearward tilted straight line is set to a value equal to or more than 15 degrees.

The type of the “light source” is not particularly limited. For example, a discharge light-emitter of a discharge bulb, a filament of a halogen lamp, or a light-emitting chip such as a light-emitting diode may be used.

A position of the “predeterminedpoint” is not particularly limited in accordance with one or more embodiments of the present invention, as long as it is on the optical axis behind the projection lens.

The “rearward tilted straight line” means a straight line is extending while being displaced toward the rear side from the bottom end edge to the upper end edge of the rear surface of the projection lens.

In accordance with one or more embodiments of the present invention, a vehicle headlamp is provided with a lamp room formed by a lamp body and a translucent cover, the lamp room accommodating a project-type lamp unit. A projection lens of the lamp unit is configured as a toroidal lens extending in an arcuate profile having the same vertical cross section profiles and having a central axis on a plumb line passing through a predetermined point on the optical axis behind the projection lens and the vertical cross section profile of the rear surface of the projection lens is configured by a rearward titled straight line and the vertical cross section profile of the front surface of the projection lens is configured by a convex curved surface formed so as to position the rear focus point of the projection lens on the optical axis. Thus, even in case the translucent cover has a surface profile tilted upward along the vehicle profile, it is possible to arrange the projection lens along the translucent cover.

As a result, it is possible to reduce the depth dimension of the lamp room accommodating the lamp unit. When the lamp unit is observed through the translucent cover, the projection lens having a toroidal surface appears as arranged along the surface profile of the translucent cover, which gives a novelty to the lighting fixture design.

According to the vehicle headlamp equipped with a projector-type lamp unit of the one or more embodiments of the present invention, it is possible to reduce the depth dimension of a lamp room and give a novelty to the lighting fixture design.

The projection lens is configured as a toroidal lens extending in an arcuate profile having the same vertical cross section profiles and having a central axis on a plumb line passing through a predetermined point on the optical axis behind the projection lens. This provides the operation/working-effect mentioned below, unlike a case where the projection lens is configured as a cylindrical lens extending in lateral direction.

Even in case the projection lens is configured as a cylindrical lens, it is possible to cause it to appear in a surface profile other than a sphere. For the cylindrical lens, incident light parallel to the optical axis goes out at an upward/downward deflection angle corresponding to the vertical cross section profile. On the other hand, light incident in a rightward/leftward slanting direction with respect to the optical axis goes out at an upward/downward deflection angle different from that of the incident light parallel to the optical axis. This prevents accurate control of the outgoing light. In contrast, in case the projection lens is configured as the toroidal lens described above, the divergent light from the predetermined point incident on the toroidal lens passes in lateral direction. Thus, by causing the light from a light source reflected onto a reflector to converge in the vicinity of the predetermined point, it is possible to perform accurate control of the outgoing light.

By providing a configuration where the lamp unit is arranged in order for the upper end of the shade to be positioned near the optical axis in the vicinity of the rear focus point of the projection lens and where the lamp unit is equipped with a shade for shielding part of the reflected light from a reflector, it is possible to form a light distribution pattern having a cutoff line at its upper end by way of irradiation of light from the lamp unit. Note that, to implement the configuration, it is necessary to converge light from the light source reflected onto the reflector in front of the rear focus point of the projection lens in a horizontal plane. In this case, by setting the position of the predetermined point in front of the rear focus point of the projection lens, it is possible to cause the reflected light from the reflector to approximately pass through the projection lens in a horizontal plane. This forms a crisp cutoff line.

As mentioned above, the rear tilt angle of the rearward tilted straight line is not particularly limited in the above configuration. By setting the rear tilt angle to a value equal to or more than 15 degrees, it is possible to give considerable novelty to the lamp unit design. In case the rear tilt angle is set to a value equal to or more than 20 degrees, it is possible to give further novelty to the lamp unit design.

Other aspects and advantages of the invention will be apparent from the following description and the appended claims.

DESCRIPTION OF THE PREFERRED EMBODIMENTS

Embodiments of the invention will be described referring to drawings.

Figure 1:
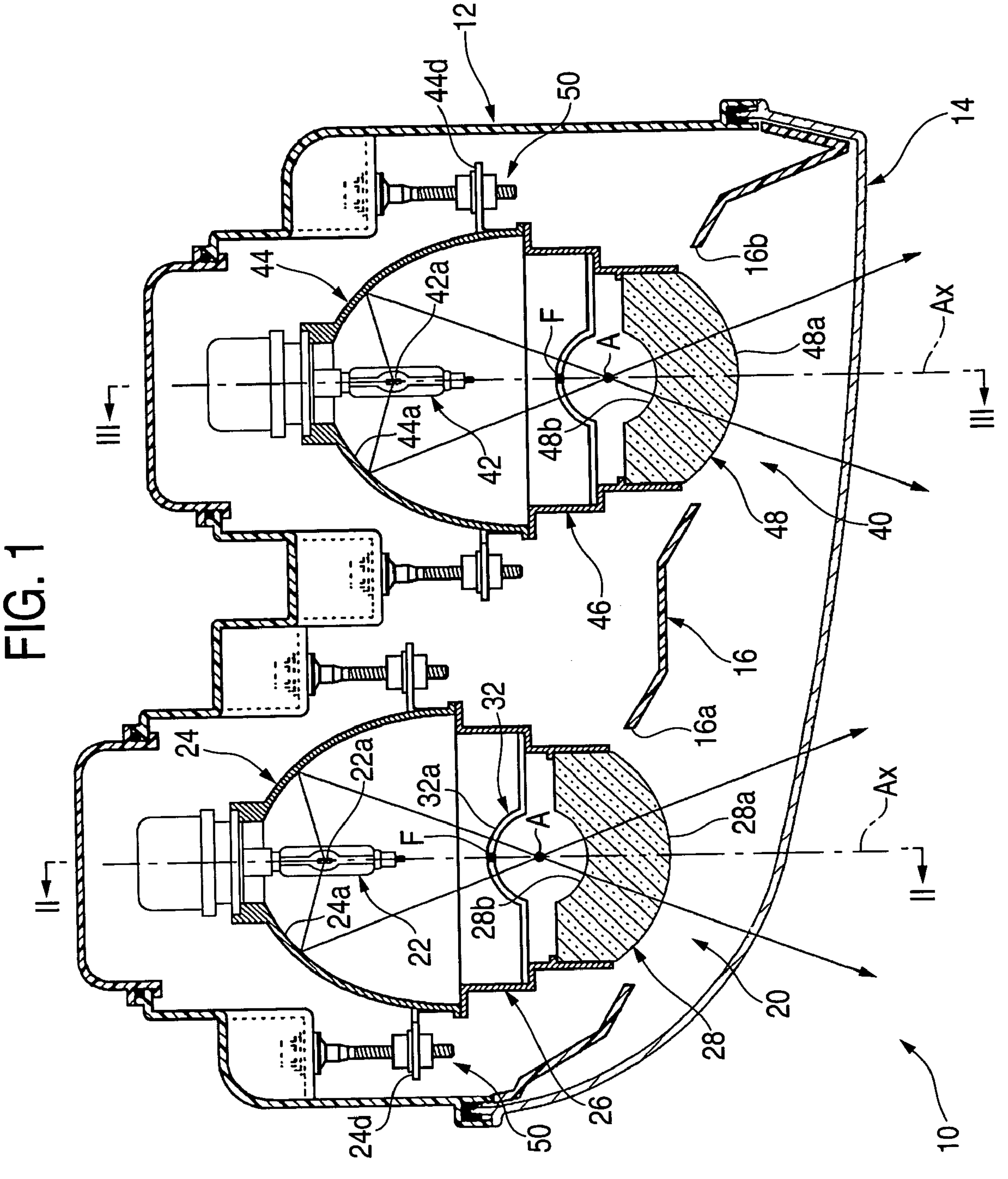
FIG. 1 is a horizontal cross section of a vehicle headlamp.
Figure 2:
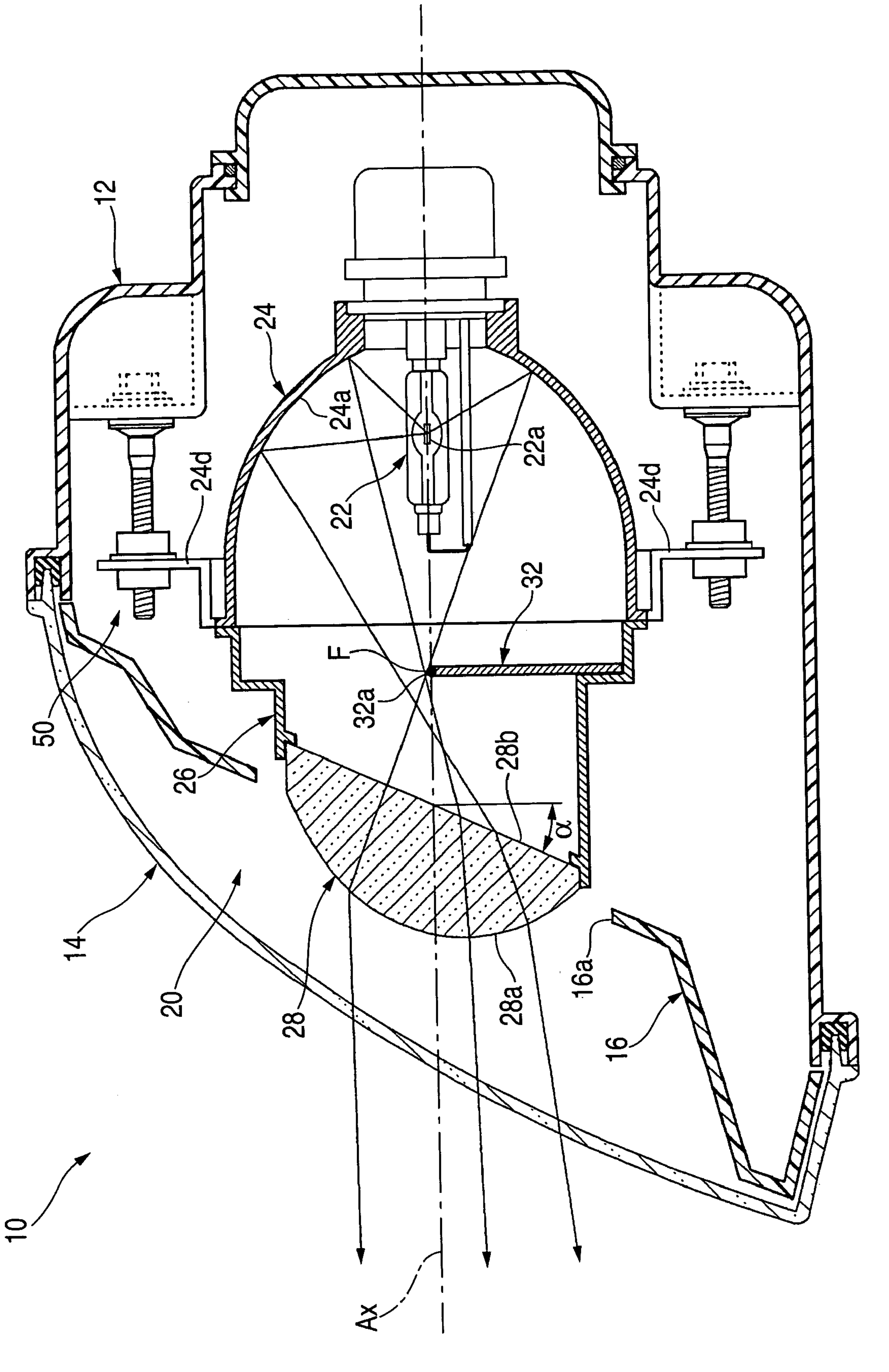
FIG. 2 is a cross section of a II-II line of the vehicle headlamp shown in FIG. 1.
Figure 3:
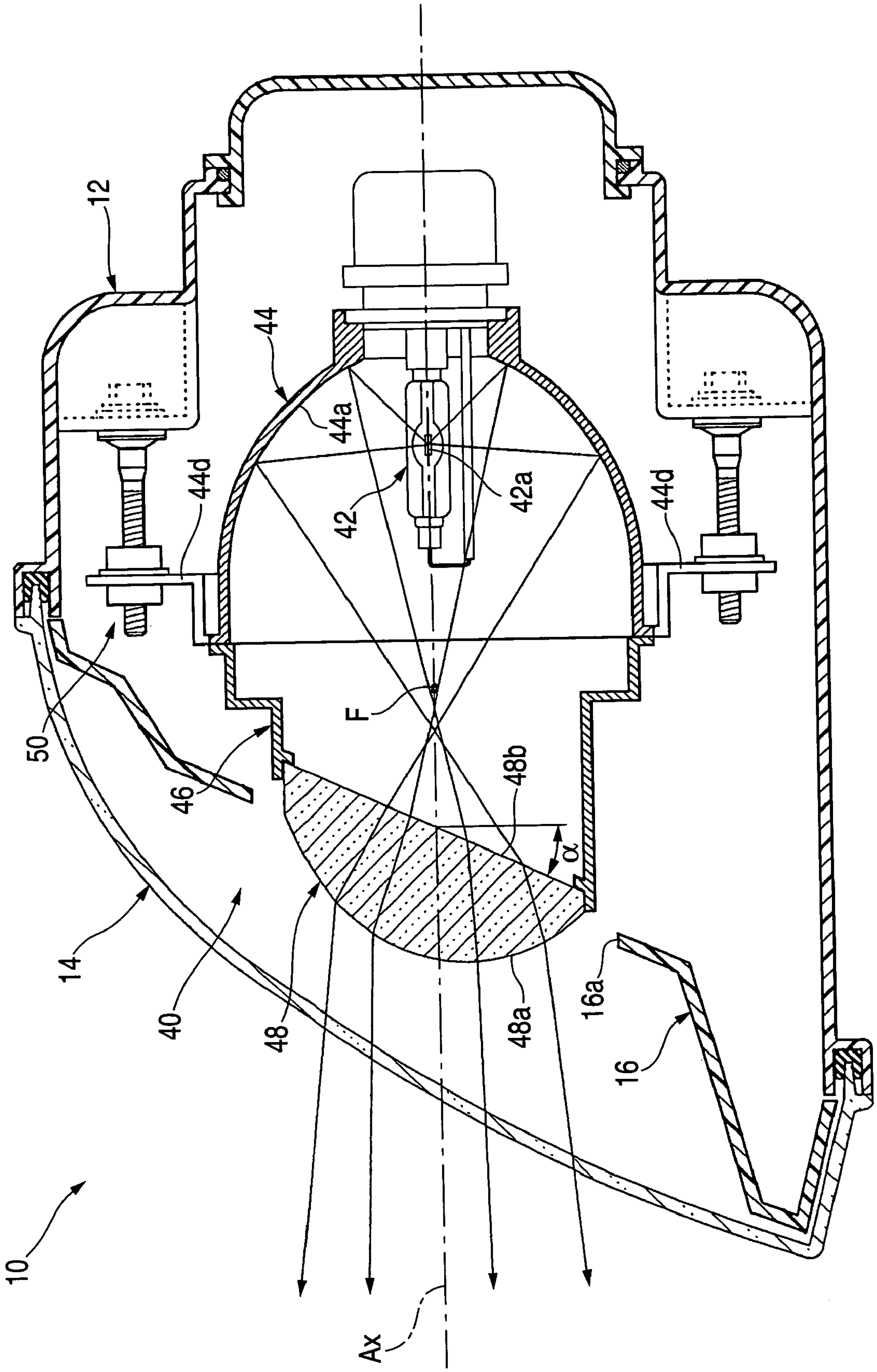
FIG. 3 is a cross section of a III-III line of the vehicle headlamp shown in FIG. 1.

FIG. 1 is a horizontal cross section of a vehicle headlamp 10. FIGS. 2 and 3 are respectively a cross section of a II-II line and a cross section of a III-III line of the vehicle headlamp 10.

As shown in these figures, the vehicle headlamp 10 is a lighting fixture arranged at the front right section of a vehicle where two lamp units 20, 40 are adjacently accommodated in vehicle width direction in a lamp room formed by a lamp body 12 and a see-through translucent cover 14 attached to the front end opening of the lamp body. The vehicle headlamp 10 forms a low beam light distribution pattern by way of lighting of the lamp unit 20 as well as a high beam light distribution pattern by way of simultaneous lighting of the lamp units 20 and 40.

The two lamp units 20, 40 each has an optical axis Ax extending in the longitudinal direction of a vehicle and is supported tiltably by the lamp body 12 in vertical direction and lateral direction via an aiming mechanism 50. Once aiming adjustment is made by the aiming mechanism 50, the optical axis Ax of the lamp unit 20 extends in a direction 0.5 to 0.6 degrees downward with respect to the longitudinal direction of a vehicle, while the optical axis Ax of the lamp unit 40 extends in the longitudinal direction of a vehicle.

The translucent cover 14 is designed to go around considerably rearward along the car body of the right corner of the vehicle front end, from inside in vehicle width direction to outside in vehicle direction and from its bottom end edge to its upper end edge. Thus, the two lamp units 20, 40 are arranged so that the lamp unit 20 positioned outside in vehicle width direction will be dislocated rearward to some extent with respect to the lamp unit 40 positioned inside in vehicle width direction.

In the lamp room, an extension panel 16 is provided along the translucent cover 14. In the extension panel 16, openings 16*a*, 16*b* surrounding the lamp units 20, 40 is formed in the vicinity of its front end.

The configuration of each of the lamp units 20, 40 will be described.

First, the configuration of the lamp unit 20 is described below.

Figure 4:
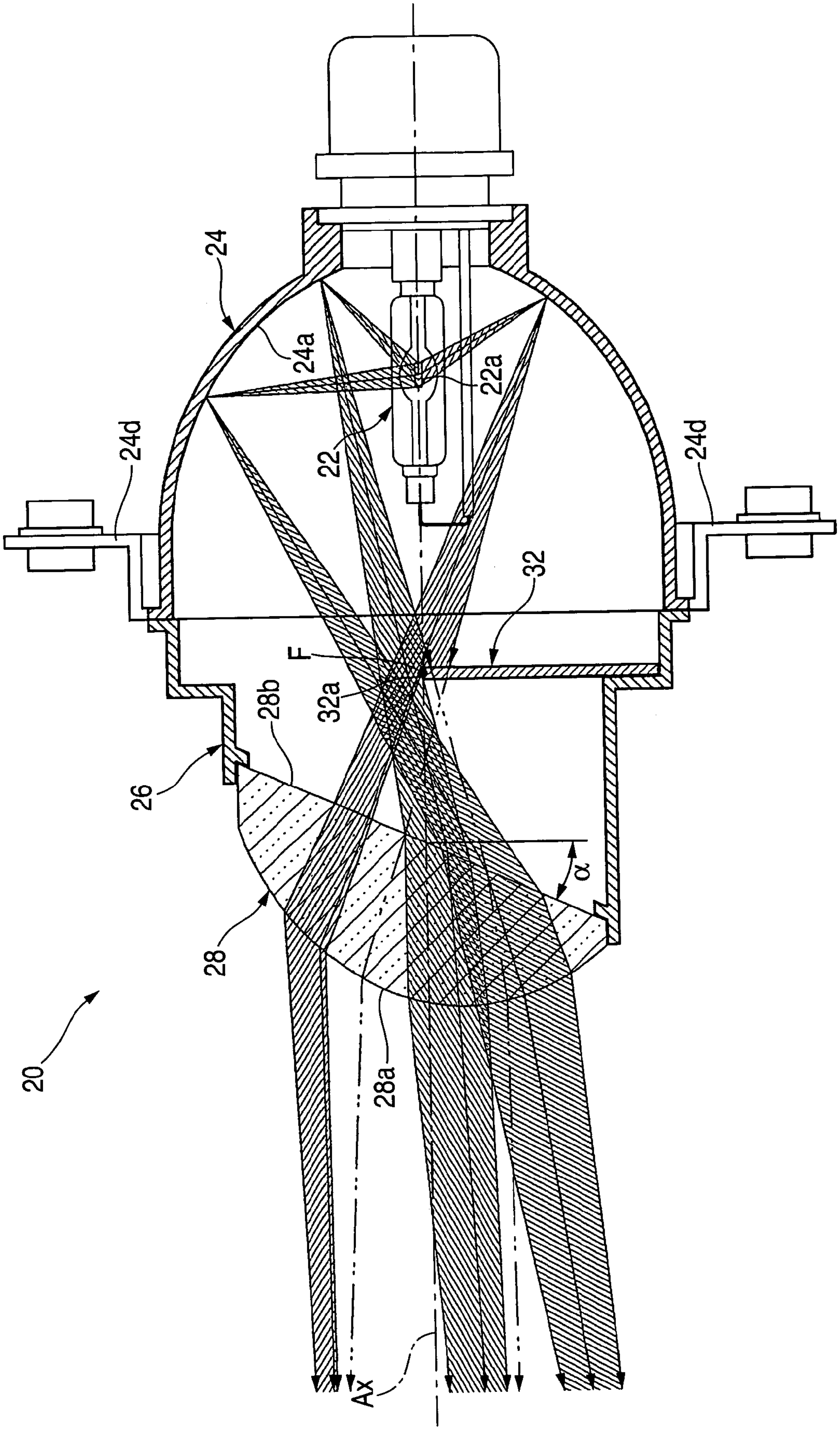
FIG. 4 is a side cross section of a lamp unit shown in FIG. 2 as a standalone unit.
Figure 5:
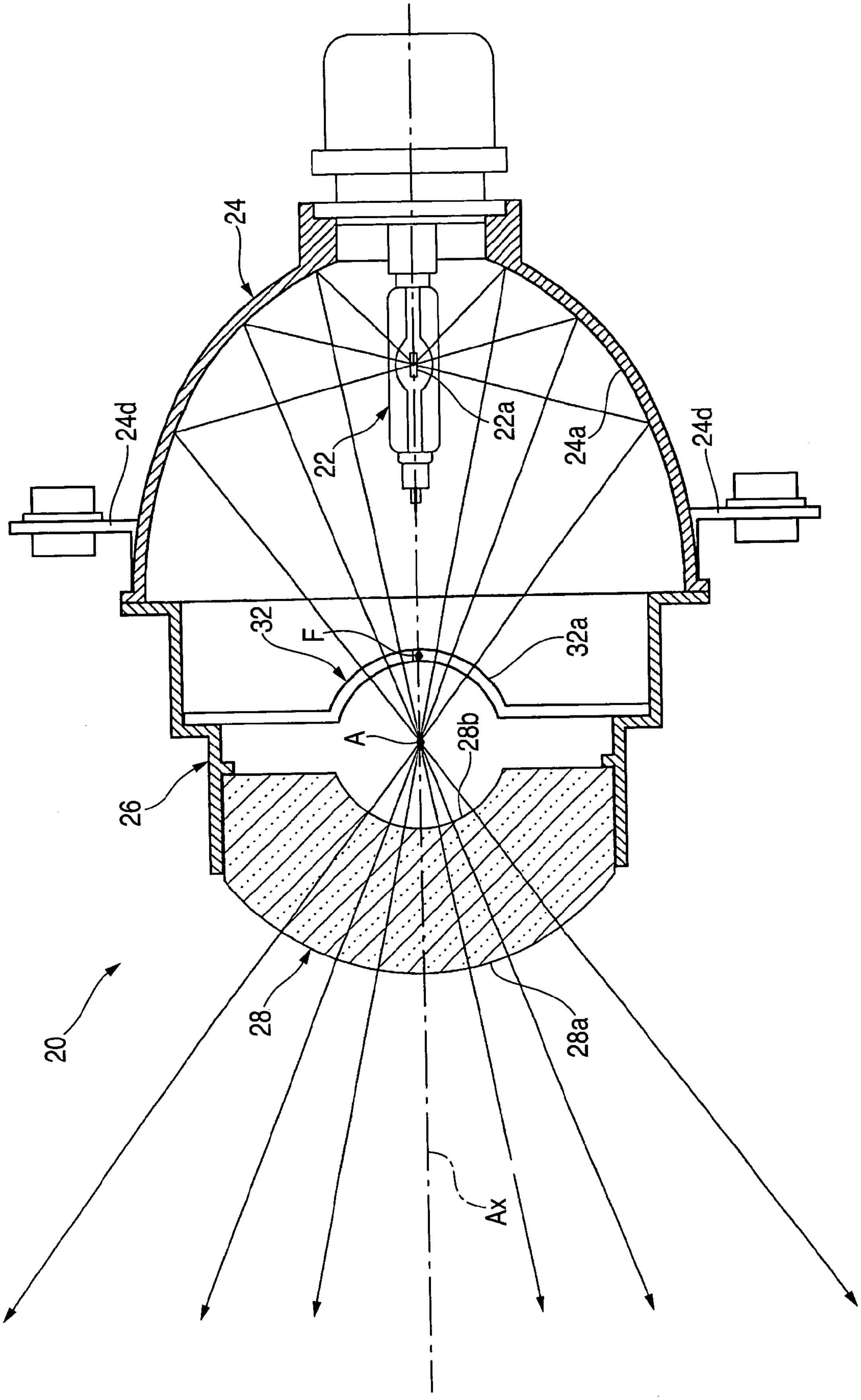
FIG. 5 is a horizontal cross section of the lamp unit shown in FIG. 2 as a standalone unit.
Figure 6:
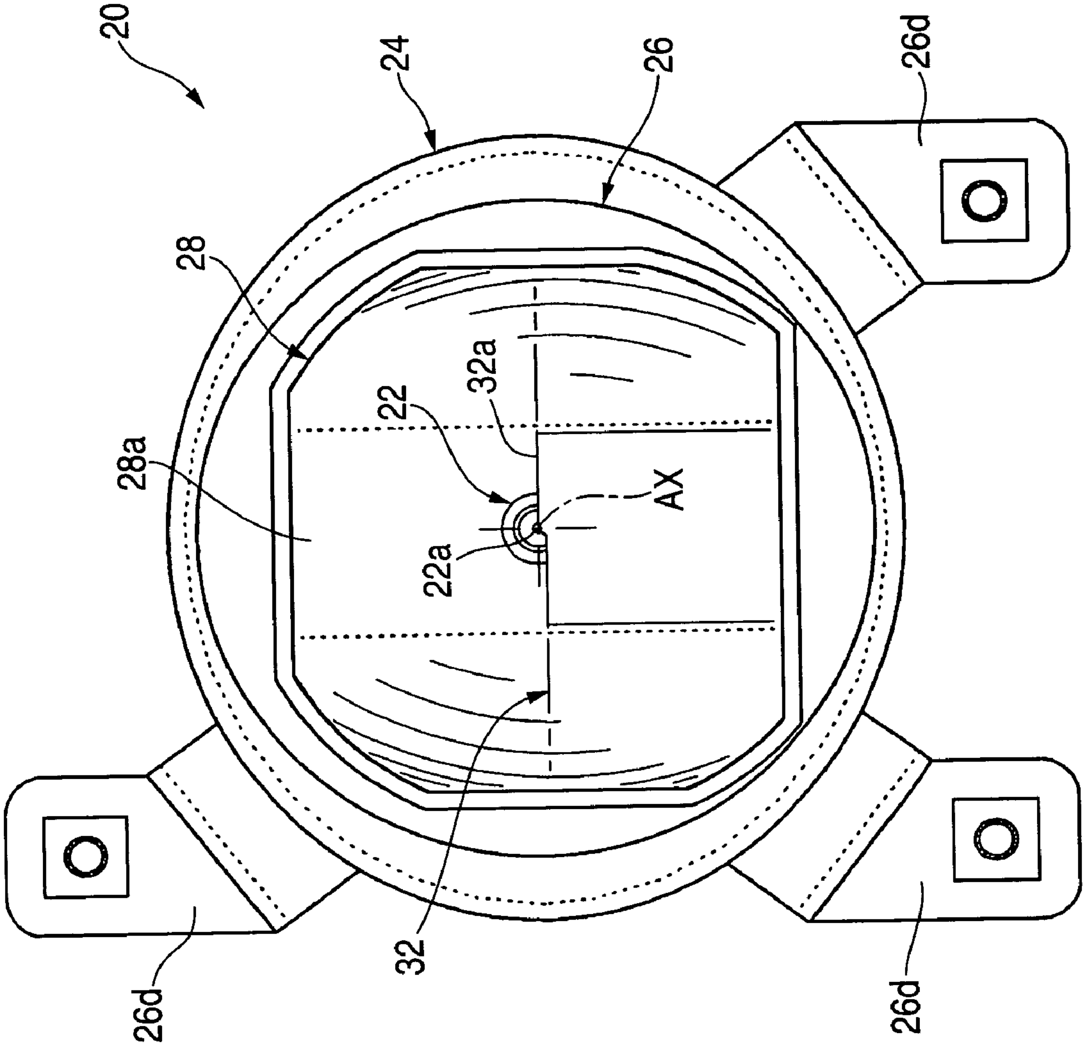
FIG. 6 is a front view of the lamp unit shown in FIG. 2 as a standalone unit.
Figure 7:
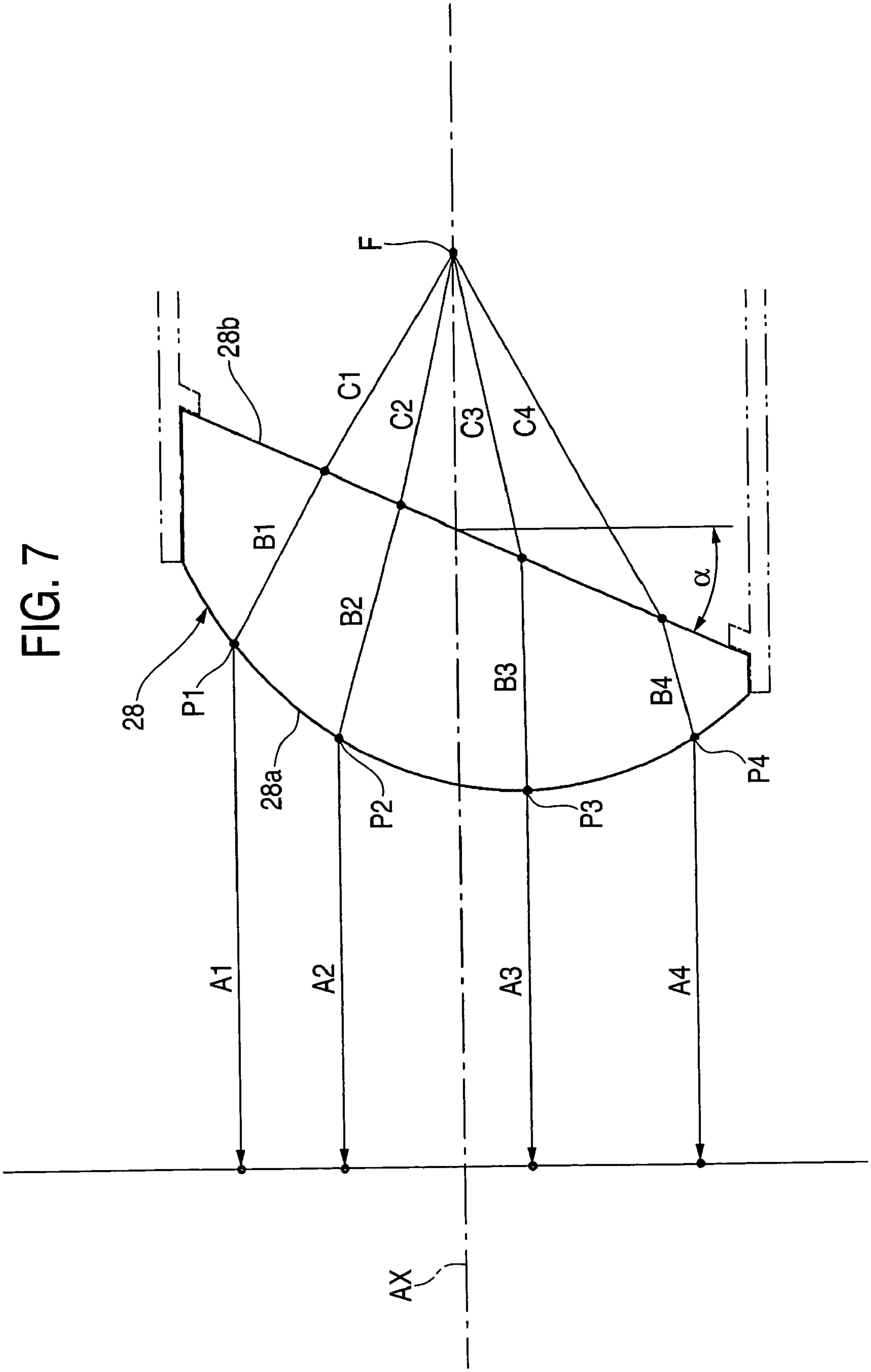
FIG. 7 illustrates the vertical cross section profile of the projection lens of the lamp unit shown in FIG. 2.

FIGS. 4, 5 and 6 are a side cross section, a horizontal cross section and a front view of the lamp unit 20 as a standalone unit, respectively.

As shown in the figures, the lamp unit 20 is a projector-type lamp unit and comprises a light source bulb 22, a reflector 24, a lens holder 26, a projection lens 28 and a shade 32.

The projection lens 28 is configured as a toroidal lens. The toroidal lens has an arcuate profile. The arcuate profile has a has a central axis on a plumb line passing through a predetermined point A on the optical axis Ax behind the projection lens 28. Vertical cross sections of the arcuate profile are formed to be the same shapes. The respective vertical cross sections are provided on vertical planes that extend through the toroidal lens and include the plumb line. As a result, the projection lens 28 transmits divergent light from the predetermined point A in a horizontal plane.

The rear surface 28*b* of the projection lens 28 has a vertical cross section profile constituted by a rearward tilted straight line. The rear tilt angle α of the rearward tilted straight line constituting the vertical cross section profile of the rear surface 28*b* is set to a value equal to or more than 15 degrees (to be more precise, α=25 degrees).

The front surface 28*a* of the projection lens 28 has a vertical cross section profile constituted by a convex curved surface formed so as to position the rear focus point F of the projection lens 28 on the optical axis Ax. That is, the convex curved surface constituting the vertical cross section profile of the front surface 28*a* is set as an envelope of points Pi (i=1, 2, 3 . . . ) where the optical axis length Ai+nBi+Ci (i=1, 2, 3 . . . ) from the rear focus point F set on the optical axis Ax to a plane orthogonal to the optical axis arranged in front of the projection lens 28 is constant. Note that n in the expression of the optical axis length is the refractive index of the projection lens 28.

Thus, the projection lens 28 has, as a focal line, the arc whose center is the predetermined point A and which passes through the rear focus point F in a horizontal plane including the optical axis Ax. The projection lens 28 is designed to project forward an image on a cylindrical face including the focal line as an inverted image.

The light source bulb 22 is a discharge bulb such as a metal halide bulb whose discharge emitter is a light source 22*a*. The light source 22*a* is constituted as a line segment light source extending in the center axis of the bulb. The light bulb 22 is inserted and fixed from behind to the rear top opening of the reflector 24 so that the light source 22 will be positioned on the optical axis Ax behind the rear focus point F of the projection lens 28.

The reflector 24 has a reflection surface 24*a* that reflects light from the light source 22*a* in forward direction toward an area close to the optical axis Ax. The reflection surface 24*a* has an almost elliptical cross section. The eccentricity of the reflection surface 24*a* is designed to gradually increase from the vertical cross section to the horizontal cross section. Thus, the light from the light source 22 reflected onto the reflection surface 24*a* is almost converged in the vicinity of the rear focus point F in the vertical cross section while the convergence position of the light is converged to the predetermined point A in the horizontal cross section.

The reflector 24 is supported by the lamp body 12 via an aiming mechanism 50 at aiming brackets 24*d* formed on three sections of the reflector 24.

The shade 32 is fixedly supported by a lens holder 26 while positioned in an approximately lower section of the internal space of the lens holder 26. The shade 32 is formed so that its upper end edge 32*a* will pass through the rear focus point F of the projection lens 28. This shields part of reflected light from the reflection surface 24*a* of the reflector 24 to remove most of the upward light irradiated forward from the projection lens 28. The upper end edge 32*a* of the shade 32 extends along the arcuate focal line passing through the rear focus point F of the projection lens 28 in horizontal direction in an approximately arcuate profile and has a stepped difference in lateral direction.

The lens holder 26 is formed so as to extend forward, in the profile of an approximate stepped/tapered cylinder, from the front end opening of the reflector 24. The lens holder 26 is fixedly supported by the reflector 24 at its rear end and fixedly supports the projection lens 28 at its front end.

Next, the configuration of the lamp unit 40 is described below.

As shown in FIGS. 1 and 3, same as the lamp unit 20, the lamp unit 40 is a projector-type lamp unit comprising a light source bulb 42, a reflector 44, a lens holder 46, and a projection lens 48.

Unlike the lamp unit 20, the lamp unit 40 does not have a shade 32. The remaining configuration of the lamp unit 40 is the same as that of the lamp unit 20. Note that the lamp unit 40 is also supported by the lamp body 12 via the aiming mechanism 50 at aiming brackets 44*d* formed on three sections of the reflector 44.

Figure 8A:
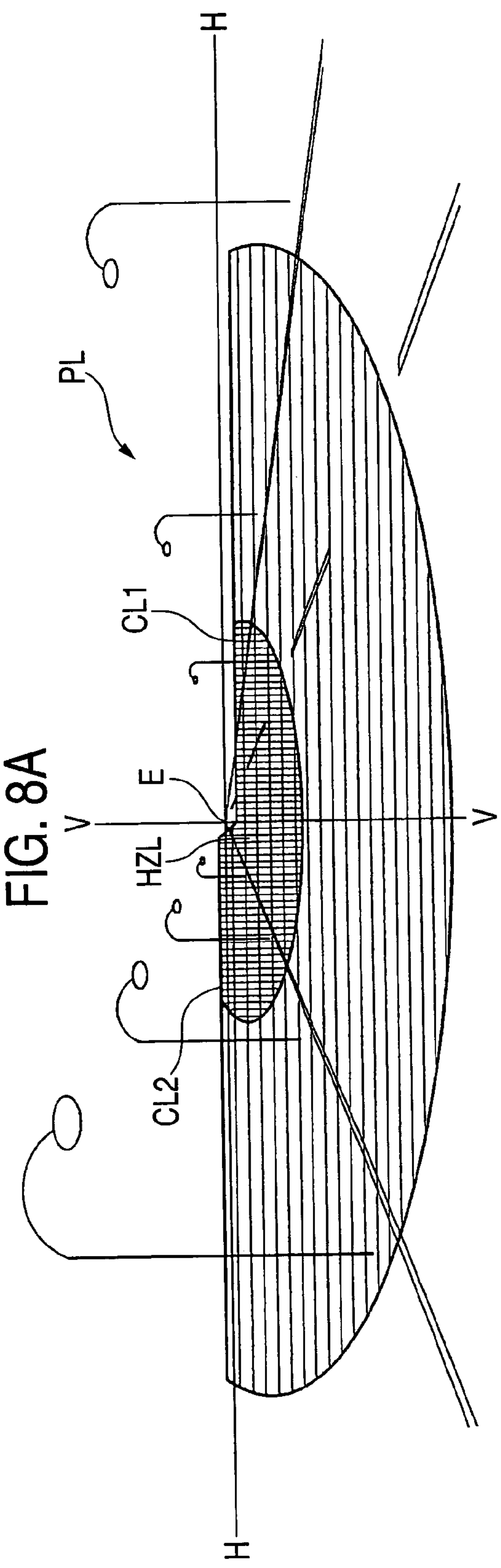
FIG. 8A is a perspective view of a low beam light distribution pattern formed on a virtual vertical screen arranged at a position 25 meters ahead of the lamp unit by the light irradiated forward from the vehicle headlamp.
Figure 8B:
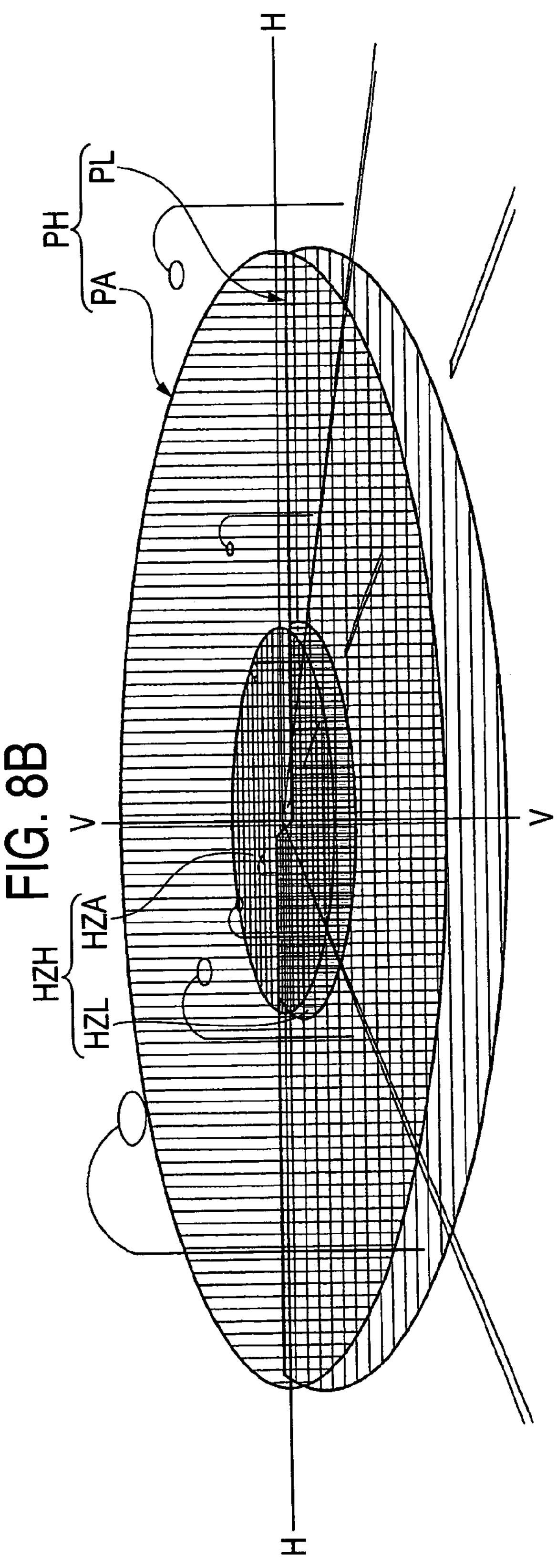
FIG. 8B is a perspective view of a high beam light distribution pattern formed on a virtual vertical screen arranged at a position 25 meters ahead of the lamp unit by the light irradiated forward from the vehicle headlamp.

FIGS. 8A and 8B are perspective views of light distribution patterns formed on virtual vertical screens arranged at positions 25 meters ahead of the lamp units by the light irradiated forward from the vehicle headlamp 10. FIG. 8A shows a low beam light distribution pattern formed by way of lighting of the lamp unit 20. FIG. 8B shows a high beam light distribution pattern formed by way of simultaneous lighting of the lamp units 20 and 40.

As shown in FIG. 8A, the low beam light distribution pattern PL is a left side light distribution pattern that has cutoff lines CL1, CL2 with a stepped difference. The cutoff lines CL1, CL2 extends, with a stepped difference, in horizontal direction, about a V-V line passing through H-V as an erase point in the front direction of the lamp unit. The oncoming lane section on the right side of the V-V line is formed as the lower cutoff line CL1, while the own lane section on the left side of the V-V line is formed as the upper cutoff line CL2 stepped up via a tilted section from the cutoff line CL1. In the low beam light distribution pattern PL, the position of an elbow point E as the intersection of the lower cutoff line CL1 and the V-V line is set some 0.5 to 0.6 degrees below H-V. A hot zone HZL as a high intensity area is formed to surround the elbow point E.

The low beam light distribution pattern PL is formed by irradiation of light from the lamp unit 20. To be more precise, the low beam light distribution pattern PL is formed by projecting, as an inverted projection image, by way of reflected light from the reflection surface 24*a* of the reflector 24, the image of the light source 22*a* formed on the rear focal plane of the projection lens 22 onto the virtual vertical screen. The cutoff lines CL1, CL2 are formed as inverted projection images of the upper end edge 32*a* of the shade 32.

As shown in FIG. 8B, the high beam light distribution pattern PH is configured as a synthetic light distribution pattern of the low beam light distribution pattern PL and an additional light distribution pattern PA formed by irradiation of light from the lamp unit 40.

The additional light distribution pattern PA is a horizontally oriented light distribution pattern extending rightward and leftward about H-V. The overall diffusion angle of the additional light distribution pattern PA is almost the same as that of the low beam light distribution pattern PL. The hot zone HZA of the additional light distribution pattern is formed about H-V.

In the high beam light distribution pattern PH, the low beam light distribution pattern PL is synthesized with the additional light distribution pattern PA so as to irradiate light up to the upper area of the cutoff line CL1, CL2, thereby forming a bright hot zone HZH by way of overlaying of hot zones HZL and HZA in the vicinity of H-V.

As detailed above, the vehicle headlamp 10 according to this embodiment comprises the lamp room formed by a lamp body 12 and the translucent cover 14, the lamp room accommodating two projector-type lamp units 20, 40. The projection lens 28, 48 of the lamp unit 20, 40 is configured as a toroidal lens extending in an arcuate profile having a central axis on a plumb line passing through a predetermined point A on the optical axis Ax behind the projection lens 28, 48. Vertical cross sections of the toroidal lens have the same shape, in which the respective vertical cross sections are provided on vertical planes that extend through the toroidal lens and include the plumb line. The vertical cross section profile of the rear surface 28*b*, 48*b* of the projection lens is configured by a rearward titled straight line and the vertical cross section profile of the front surface 28*a*, 48*a* of the projection lens is configured by a convex curved surface formed so as to position the rear focus point F of the projection lens 28, 48 on the optical axis Ax. Thus, although the translucent cover 14 has a surface profile tilted upward along the vehicle profile, it is possible to arrange the projection lens 28, 48 along the translucent cover 14.

As a result, it is possible to reduce the depth dimension of the lamp room accommodating the lamp unit 20, 40. When the lamp unit 20, 40 is observed through the translucent cover 14, the projection lens 28, 48 having a toroidal surface appears as arranged along the surface profile of the translucent cover 14, which gives a novelty to the lighting fixture design.

According to the vehicle headlamp 10 equipped with a projector-type lamp unit 20, 40 of the embodiment, it is possible to reduce the depth dimension of a lamp room and give a novelty to the lighting fixture design.

In particular, according to this embodiment, the projection lens 28, 48 is configured as a toroidal lens extending in an arcuate profile having a central axis on a plumb line passing through a predetermined point A on the optical axis behind the projection lens. Vertical cross sections of the troidal lens have the same shape, in which the respective vertical cross sections are provided on vertical planes that extend through the toroidal lens and include the plumb line. This provides the operation/working-effect mentioned below, unlike a case where the projection lens is configured as a cylindrical lens extending in lateral direction.

Even in case the projection lens 28, 48 is configured as a cylindrical lens, it is possible to cause it to appear in a surface profile other than a sphere. For the cylindrical lens, incident light parallel to the optical axis Ax goes out at an upward/downward deflection angle corresponding to the vertical cross section profile. On the other hand, light incident in a rightward/leftward slanting direction with respect to the optical axis Ax goes out at an upward/downward deflection angle different from that of the incident light parallel to the optical axis Ax. This prevents accurate control of the outgoing light. In contrast, in case the projection lens 28, 48 is configured as the toroidal lens described above, the divergent light from the predetermined point A incident on the toroidal lens passes in lateral direction. Thus, by causing the light from a light source reflected onto a reflector 24, 44 to converge to the predetermined point A, it is possible to perform accurate control of the outgoing light.

One lamp unit 20 is equipped with a shade 32 for shielding part of the reflected light from the reflector 24. The upper end edge 32*a* of the shade 32 is arranged to position on the optical axis Ax at the rear focus point F of the projection lens 28. It is thus possible to form a low beam light distribution pattern PL having cutoff lines CL1, CL2 at its upper end by way of irradiation of light from the lamp unit 20. Note that, to implement the configuration, it is necessary to converge light from the light source 22*a* reflected onto the reflector 24 in front of the rear focus point F of the projection lens 28 in a horizontal plane. In this case, the position of the predetermined point A is set in front of the rear focus point F of the projection lens 28, it is possible to cause the reflected light from the reflector 24 to approximately pass through the projection lens 28 in a horizontal plane. This forms the cutoff line CL1, CL2 as a crisp cutoff line.

In this embodiment, the rear tilt angle α of the rearward tilted straight line constituting the vertical cross section profile of the rear surface 28*b*, 48*b* of each projection lens 28, 48 is set to a considerably large value of 25 degrees. This ensures the novelty of the lamp unit design.

While two lamp units 20, 40 are accommodated in the lamp room of the vehicle headlamp 10 according to the embodiment, a configuration where either the lamp unit 20 or lamp unit 40 alone is accommodated in the lamp room obtains the same operation/working-effect as the above embodiment.

While the rear tilt angle α of the rearward tilted straight line constituting the vertical cross section profile of the rear surface 28*b*, 48*b* of each projection lens 28, 48 is set to 25 degrees in the above embodiment, these values may be set to different values. A value other than 25 degrees, as long as it is 15 degrees or more, obtains almost the same operation/working-effect as the above embodiment.

While the vehicle headlamp 10 arranged at the front right end of a vehicle has been described in the above embodiment, a vehicle headlamp arranged at the front left end of a vehicle obtains the same operation/working-effect as the above embodiment by employing the same configuration as the above embodiment.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a lamp unit having an optical axis extending in a longitudinal direction of a vehicle, the lamp unit including:

a projection lens arranged on the optical axis;

a light source arranged behind a rear focus point of the projection lens; and a reflector that reflects light from the light source in a forward direction close to the optical axis, wherein the projection lens comprises a toroidal lens having an arcuate profile, wherein the arcuate profile has a central axis on a plumb line passing through a predetermined point on the optical axis behind the projection lens, vertical cross sections of the toroidal lens have the same shape, and the respective vertical cross sections are provided on vertical planes that extend through the toroidal lens and include the plumb line;

vertical cross section profiles of the rear surface of the toroidal lens are configured by rearward tilted straight lines, and vertical cross section profiles of the front surface of the toroidal lens are configured by convex curved lines formed so as to position the rear focus point of the projection lens on the optical axis.

2. The vehicle headlamp according to claim 1, further comprising:

a lamp room formed by a lamp body and a translucent cover attached to the front end opening of the lamp body, wherein the lamp unit is accommodated in the lamp room.

3. The vehicle headlamp according to claim 2, wherein the translucent cover has a surface profile tilted upward along a vehicle profile and outward in the vehicle width direction.

4. The vehicle headlamp according to claim 1, wherein the lamp unit further includes:

a shade for shielding part of the reflected light from the reflector wherein an upper end edge of the shade is positioned near the optical axis in the vicinity of the rear focus point.

5. The vehicle headlamp according to claim 1, wherein the pre-determined point positions between the projection lens and the rear focus point.

6. The vehicle headlamp according to claim 1, wherein a rearward tilt angle of the rearward tilted straight line is set to a value equal to or more than 15 degrees.

7. A lamp unit having an optical axis extending in a longitudinal direction of a vehicle, the lamp unit comprising:

a projection lens arranged on the optical axis;

a light source arranged behind a rear focus point of the projection lens; and a reflector that reflects light from the light source in a forward direction close to the optical axis, wherein the projection lens comprises a toroidal lens extending in an arcuate profile on a same vertical cross section profile about a plumb line passing through a predetermined point on the optical axis behind the projection lens, vertical cross sections of the toroidal lens have the same shape, and the respective vertical cross sections are provided on vertical planes that extend through the toroidal lens and include the plumb line, vertical cross section profiles of the rear surface of the toroidal lens are configured by rearward tilted straight lines, and vertical cross section profiles of the front surface of the toroidal lens are configured by convex curved lines formed so as to position the rear focus point of the projection lens on the optical axis.

8. The vehicle headlamp according to claim 7, wherein the predetermined point positions between the projection lens and the rear focus point.

* * * * *